United States Patent [19]

Ohya et al.

[11] Patent Number: 4,525,414
[45] Date of Patent: Jun. 25, 1985

[54] HEAT-SHRINKABLE COMPOSITE LAMINATE FILM AND PROCESS FOR PREPARING THE SAME

[75] Inventors: Masaki Ohya; Yoshihiro Matsukura; Mitsuru Anzai, all of Iwaki, Japan

[73] Assignee: Kureha Kagaku Kogyo Kabushiki Kaisha, Tokyo, Japan

[21] Appl. No.: 542,702

[22] Filed: Oct. 17, 1983

[30] Foreign Application Priority Data

Oct. 29, 1982 [JP] Japan ................. 57-190539

[51] Int. Cl.³ .................. B32B 7/02; B32B 27/08
[52] U.S. Cl. ..................... 428/213; 428/214; 428/216; 428/355; 428/474.4; 428/476.3; 428/516; 428/518; 428/913
[58] Field of Search ............ 428/518, 515, 516, 474.4, 428/476.3, 913, 213, 214, 216, 355

[56] References Cited

U.S. PATENT DOCUMENTS

| 3,908,070 | 9/1975 | Marzolf | 428/518 X |
| 4,438,180 | 3/1984 | Lang et al. | 428/518 X |
| 4,448,792 | 5/1984 | Schirmer | 428/518 X |
| 4,450,028 | 5/1984 | Vilutis | 428/518 X |
| 4,457,960 | 7/1984 | Newsome | 428/518 X |

FOREIGN PATENT DOCUMENTS 51-119075  10/1976  Japan ..................... 428/518

Primary Examiner—Thomas J. Herbert
Attorney, Agent, or Firm—Oblon, Fisher, Spivak, McClelland & Maier

[57] ABSTRACT

Disclosed herein is a heat-shrinkable composite laminate film comprising an intermediate layer of a copolymer of vinylidene chloride, an outer layer of a polyamide, another outer layer of an olefin resin and two adhesive layers disposed between the intermediate layer and each of the two outer layers, the adhesive layers being at least one resin selected from the group consisting of a modified copolymer of ethylene and a vinyl carboxylate or an acrylic ester by an ethylenically unsaturated carboxylic acid or an acid anhydride thereof and a polymeric material obtained by further modifying the above-mentioned modified copolymer with a metal compound, and a process for preparing the same.

8 Claims, 4 Drawing Figures

HEAT-SHRINKABLE COMPOSITE LAMINATE FILM AND PROCESS FOR PREPARING THE SAME

BACKGROUND OF THE INVENTION

The present invention relates to a heat-shrinkable composite laminate film comprising an intermediate layer of a copolymer of vinylidene chloride, an outer layer of an olefin resin, another outer layer of a polyamide and two adhesive layers disposed between each of the outer layers and the intermediate layer, the adhesive layers being at least one resin selected from the group consisting of a modified copolymer of ethylene and a vinyl carboxylate or an acrylic ester by an ethylenically unsaturated carboxylic acid or an acid anhydride thereof and a polymeric material obtained by further modifying the above-mentioned modified copolymer of ethylene and a vinyl carboxylate or an acrylic ester with a metal compound, and to a process for preparing the heat-shrinkable composite laminate film, comprising the steps of laminating melt-extruded layers still in molten state into a tubular composite laminate in which each of the adhesive layers has been disposed between the intermediate layer and each of the outer layers, and subjecting the thus obtained tubular composite laminate to simultaneous biaxial stretching by sliding the tubular composite laminate along the outer circumferential surface of a conical inner mandrel provided with the center position of the bottom of a circular die and pulling the tubular composite laminate into the longitudinal direction with a pair of take-up rolls while cooling the tubular composite laminate by hot water at a temperature in the range of from the secondary transition point of the polyamide to a temperature of higher than the secondary transition point by 20° C.

Hitherto, processed meat products such as hams and sausages have been offered to the market after being packaged in casing material made of a plastic film and then subjected to sterilization and/or cooking for a few min to a few hours at a temperature in a range of from about 70° to 95° C.

The casing material suitable for packaging a foodstuff which is subjected to heat-treatment after being packaged therein should fulfill all of the conditions mentioned as follows:

(1) That the casing material has a sufficient barriering property against gaseous oxygen for preventing the putrefaction of an article (foodstuff) during the period of the commercial circulation.

(2) That an innermost layer of the casing material in contact with the article has tenacious adhesion to cling to the article for preventing the deposit of gelatinous bouillon between the innermost layer of the casing material and the article.

(3) That the casing material does not crease because the creased package gives an impression to the consumers that the package has been prepared long before.

(4) That the casing material is not broken by the pressure at filling the casing material with the foodstuff (generally 0.2 to 0.5 kg/cm² G) and by the pressure at the time of heat-treatment due to the expansion of the article, and the cylindrical form of the package is not deformed by such a treatment. Namely, anti-creeping property (not showing any creep) at a high temperature is required to the casing material.

In other words, it is required that the casing material does not show any plastic deformation by the stress less than 0.5 kg/mm² at a temperature in a range of 70° to 95° C.

(5) That the casing material is sufficiently flexible in view of the handling operation thereof and does not form any pin-hole during packaging, etc.

(6) That any melt hole does not form on the casing material when a package is subjected to heat-treatment for a few min to a few hours at a temperature in a range of about 70° to 95° C.

(7) That the casing material has a strength enough to endure all the presumable attack.

Concerning the above-mentioned conditions, the publicly known casing material, which comprises an unstretched film of a homopolyamide (such as nylon 11 and nylon 12) or comprises an unstretched film having an inner layer of a homopolyamide such as nylon 11 and nylon 12 and an outer layer of nylon 6 is apt to be deformed by the pressure at the filling of the casing material with a foodstuff, and remarkable formation of creases is shown on the casing material at the time of cooling the package after subjecting the package to heat-treatment, because the casing material has not been stretched. In this connection, a heat-shrihkable material, comprising a stretched film of a polyamide or a mixture of a polyamide and an olefin resin is proposed in Japanese Patent Application Laying-Open No. 55-74744 (1980) and it is disclosed therein that the occurrence of the deformation and the crease are not observed thereon.

In addition, a casing material comprising a thermoplastic polyester film, for instance, polyethylene terephthalate film has also been known for packaging hams and meat pastes, however, the above-mentioned casing material is not sufficiently gas-barriering against both gaseous oxygen and water vapour and accordingly, it has a common demerit of limiting the storage time period during which the article is safe for eating to a short time. Besides, there is an inconvenience on the casing material made of the polyester file that the internal surface of the casing material in contact with the article has not sufficient adhesion to cling to the article.

On the other hand, although the casing material comprising a film of a copolymer of vinylidene chloride, which is gas-barriering against gaseous oxygen and water vapour has been broadly utilized in the meat packaging field, the film has not sufficient adhesion to cling of the inner wall of the casing material to the article such as hams and sausages, and the cylindrical shape of the filled and packaged casing material has a tendency to be creep-deformed by the weight thereof during the heat-treatment when a large amount of foodstuff has been filled therein.

As a result, an insufficient anti-creep property thereof at a high temperature has been pointed out. Besides, there is a demerit in the casing material made of a copolymer of vinylidene chloride that pin-holes are apt to be formed in the time of filling the casing material.

As an example of a heat-shrinkable composite laminate film having a layer of a copolymer of vinylidene chloride, a five-layer composite laminate film comprising a core layer of the copolymer of vinylidene chloride, an outer layer of an olefin resin and another outer layer of an ionomer and two adhesive layers disposed between the core layer and each of the two outer layers, the adhesive layers being copolymer of ethylene and vinyl acetate may be mentioned. In the case where such a casing material is subjected to heat-treatment at 90° to 98° C. in boiling water, after having been packaged with a meat product, the casing material shows the defects of forming melt-holes and deformation of the shape of the package due to creep. In addition, the innermost layer (ionomer layer) of the five-layer composite laminate film in contact with the article has not sufficient adhesion to cling to the article. Accordingly, such a five-layer composite laminate film is unsatisfactory for use in preserving a large amount of foodstuff packaged therein.

The object of the present invention is to provide a heat-shrinkable composite laminate film for use in packaging foodstuffs, in which technical problems of the conventional casing material for such a use has been overcome. Namely, the heat-shrinkable composite laminate film according to the present invention is excellent in gas-barrier property against gaseous oxygen and water vapour, strength at low temperatures and clinging property to the article therein, and is hygienically safe, and in particular, it is resistant to formation of pinholes and creases and it does not show to creep even at a high temperature of the heat-treatment of the package.

SUMMARY OF THE INVENTION

In the first aspect of the present invention, there is provided a heat-shrinkable composite laminate film comprising an intermediate layer of a copolymer of vinylidene chloride, an outer layer of an olefin resin, another outer layer of a polyamide and two adhesive layers respectively disposed between the intermediate layer and each of the two outer layers, the adhesive layers being at least one resinous material selected from the group consisting of a modified copolymer obtained by modifying a copolymer of ethylene and a vinyl carboxylate or an acrylic ester with an ethylenically unsaturated carboxylic acid or an acid anhydride thereof and a polymeric material obtained by further modifying the above-mentioned modified copolymer with a metal compound.

In the second aspect of the present invention, there is provided a process for preparing the heat-shrinkable composite laminate film comprising an intermediate layer of a copolymer of vinylidene chloride, an outer layer of an olefin resin, another outer layer of a polyamide and the adhesive material of two adhesive layers disposed between the intermediate layer and each of the two outer layers, the adhesive layers being at least one resinous material selected from the group consisting of a modified copolymer of ethylene and a vinyl carboxylate or an acrylic ester with an ethylenically unsaturated carboxylic acid or an acid anhydride thereof and a polymeric material obtained by further modifying the above-mentioned modified copolymer with a metal compound, the process comprising the step of simultaneously melt-coextruding a copolymer of vinylidene chloride as the intermediate layer, an olefin resin as the outer layer, a polyamide as another outer layer and the adhesive material as the two adhesive layers while laminating the five layers into a tubular composite laminate within a circular die, and subjecting the thus obtained tubular composite laminate to simultaneous biaxial stretching by sliding the tubular composite laminate along the external circumferential surface of a conical inner mandrel provided with the central position of the bottom of the circular die and by pulling the laminate into the longitudinal direction while cooling the tubular composite laminate by hot water at a temperature in the range of from the secondary transition point of the polyamide to a temperature of higher than the secondary transition point by 20° C.

In the third aspect of the present invention, there is provided a process for preparing the heat-shrinkable composite laminate film comprising an intermediate layer of a copolymer of vinylidene chloride, an outer layer of an olefin resin, another outer layer of a polyamide and two adhesive layers disposed between the intermediate layer and each of the two outer layers, the adhesive layers being at least one resinous material selected from the group consisting of a modified copolymer of ethylene and a vinyl carboxylate or an acrylic ester with an ethylenically unsaturated carboxylic acid or an acid anhydride thereof and a polymeric material obtained by further modifying the above-mentioned modified copolymer with a metal compound, the process comprising the step of melt-extruding a copolymer of vinylidene chloride as the intermediate layer, an olefin resin as the outer layer and the adhesive material as the two adhesive layers, and a layer of polyamide from a circular die, respectively, thereby obtaining a four-layer composite laminate film comprising the outer layer of the olefin resin, the adhesive layer, the intermediate layer and the adhesive layer and a film of polyamide, laminating the thus melt-extruded four-layer composite laminate film with polyamide film as outer layer still in molten state into a five-layer tubular composite laminate in which each of the two adhesive layers has been disposed between the intermediate layer and each of the outer layers, and subjecting the thus obtained tubular composite laminate to simultaneous biaxial stretching by sliding the tubular composite laminate along the external circumferential surface of a conical inner mandrel provided with the central position of the bottom of the circular die and by pulling the tubular composite laminate into the longitudinal direction while cooling the tubular composite laminate by hot water at a temperature in the range of from the secondary transition point of the polyamide to a temperature of higher than the secondary transition point by 20° C.

In the fourth aspect of the present invention, there is provided a process for preparing the heat-shrinkable composite laminate film comprising an intermediate layer of a copolymer of vinylidene chloride, an outer layer of an olefin resin and another outer layer of a polyamide, the adhesive material of two adhesive layers disposed between the intermediate layer and each of the two outer layers, the adhesive layers being at least one resinous material selected from the group consisting of a modified copolymer of ethylene and a vinyl carboxylate or an acrylic ester with an ethylenically unsaturated carboxylic acid or an acid anhydride thereof and a polymeric material obtained by further modifying the above-mentioned modified copolymer with a metal compound, the process comprising the step of simultaneously melt-coextruding a copolymer of vinylidene chloride as the intermediate layer, an olefin resin as the outer layer, a polyamide as another outer layer and the adhesive material as the two adhesive layers while laminating the five layers into a tubular composite laminate within a circular die, subjecting the thus obtained tubular composite laminate to simultaneous biaxial stretching by sliding the tubular composite laminate along the external circumferential surface of a conical inner mandrel provided with the central position of the bottom of the circular die and by pulling the tubular composite laminate into the longitudinal direction while cooling the tubular composite laminate by hot water at a temperature in the range of from the secondary transition point of the polyamide to a temperature of higher than the secondary transition point by 20° C., and subsequently subjecting the thus biaxially stretched tubular composite laminate to a further simultaneous biaxial stretching by the pressure of the intentionally enclosed air within the tubular composite laminate by pulling the tubular composite laminate into the longitudinal direction so that the diameter of the thus biaxially stretched tubular composite laminate is larger than the external diameter of the conical inner mandrel.

In the fifth aspect of the present invention, there is provided a process for preparing the heat-shrinkable composite laminate film comprising an intermediate layer of a copolymer of vinylidene chloride, an outer layer of an olefin resin and another outer layer of a polyamide, two adhesive layers disposed between the intermediate layer and each of the two outer layers, the adhesive layers being at least one resinous material selected from the group consisting of a modified copolymer of ethylene and a vinyl carboxylate or an acrylic ester with an ethylenically unsaturated carboxylic acid or an acid anhydride thereof and a polymeric material obtained by further modifying the above-mentioned modified copolymer with a metal compound, the process comprising the step of melt-extruding a copolymer of vinylidene chloride as the intermediate layer, an olefin resin as the outer layer and the adhesive material as the two adhesive layers, and layer of polyamide from a circular die, thereby obtaining a four-layer composite laminate film comprising the outer layer of an olefin resin, the adhesive layer, the intermediate layer and the adhesive layer and a film of polyamide, respectively, laminating the thus melt-extruded four-layer composite laminate film with polyamide film as outer layer still in molten state into a five-layer tubular composite laminate in which each of the two adhesive layers has been disposed between the intermediate layer and each of the outer layers, subjecting the thus obtained tubular composite laminate to simultaneous biaxial stretching by sliding the tubular composite laminate along the external circumferential surface of a conical inner mandrel provided with the central position of the bottom of the circular die and by pulling the tubular composite laminate into the longitudinal direction while cooling the tubular composite laminate by hot water at a temperature in the range of from the secondary transition point of the polyamide to a temperature of higher than the secondary transition point by 20° C., and subsequently subjecting the thus biaxially stretched tubular composite laminate to a further simultaneous biaxial stretching by the pressure of the intentionally enclosed air within the tubular composite laminate by pulling the tubular composite laminate into the longitudinal direction so that the diameter of the thus biaxially stretched tubular composite laminate is larger than the external diameter of the conical inner mandrel.

BRIEF EXPLANATION OF THE DRAWINGS

Of the attached drawings.

DETAILED DESCRIPTION OF THE INVENTION

The copolymer of vinylidene chloride as the intermediate layer according to the present invention is a copolymer composed of 65 to 95% by weight of vinylidene chloride and 35 to 5% by weight of a copolymerizable comonomer selected from the group consisting of, for instance, vinyl chloride, acrylonitrile, ($C_1$-$C_{18}$) alkyl acrylate, ($C_1$-$C_{18}$) alkyl methacrylate, acrylic acid, methacrylic acid and the like. In the case where the content of vinylidene chloride in the copolymer of vinylidene chloride is less than 65% by weight, the copolymer is rubber-like at ordinary temperature and accordingly, it is impossible to obtain any shaped body with a stabilized form from such a copolymer. On the other hand, in the case where the content of vinylidene chloride in the copolymer is larger than 95% by weight, the melting point of such a copolymer is too high to be subjected to a stabilized processing by melt-extrusion. The copolymer of vinylidene chloride for use according to the present invention may contain a small amount of a plasticizer(s) and a stabilizer(s) according to the necessity as well as the small amount of other additives. These additives have been publicly known by the skilled persons in the art. Dioctyl sebacate, dibutyl sebacate and acetyl tributyl citrate as plasticizers may be mentioned, and epoxydized soy-bean oil as stabilizers may be mentioned.

The thickness of the intermediate layer of the copolymer of vinylidene chloride is 3 to 30 micrometers, and in the case where the thickness is below 3 micrometers, it is difficult to retain the gas-barrier property of the heat-shrinkable composite laminate film against gaseous oxygen and water vapour, which is one of the objects of the present invention. On the other hand, in the case where the thickness thereof is over 30 micrometers, it is difficult to prevent the occurrence of cracks and pin-holes at low temperatures due to the low temperature brittleness of the casing material itself even the intermediate layer has been protected between the outer layers of the polyolefin resin and of the polyamide.

The olefin resin as one of the outer layers of the composite laminate film according to the present invention is high-density polyethylene, middle-density polyethylene, low-density polyethylene, a copolymer of ethylene and vinyl acetate, a copolymer of ethylene and an acrylic ester, a copolymer of ethylene and propylene, polypropylene, a copolymer of ethylene and an alpha-olefin except for propylene which is so-called low-density linear polyethylene (LLDPE) and an ionomer may be mentioned. The outer layer of the olefin resin is effective in giving mechanical strength, particularly, the strength and softness even at low temperatures to the heat-shrinkable composite laminate film. The thickness of the outer layer of an olefin resin is not limited particularly, however, it is preferably 5 to 50 micrometers from the general viewpoint of the performance of the casing material of the heat-shrinkable composite laminate film of the present invention.

The polyamide as another outer layer (namely, the inner layer of casing material), nylon 6 (polycaprolactam), nylon 6—6 (polyhexamethylene adipamide), nylon 6-66 (a copolymer of epsilon-caprolactam and hexamethylene adipamide), nylon 6-10 (polyhexamethylene sebacamide) and nylon 12 (a polymer of ring-opened laurinlactam) may be mentioned.

From the view point of processability of the polyamide in melt-extruding and of the melt-extruded tubular film of the polyamide in the stretching step, the polyamide showing a melt-viscosity in a range of from $5 \times 10^3$ to $50 \times 10^3$ poise is preferable and that in a range of 10 to $20 \times 10^3$ poise is most preferable, the value being measured under the conditions of melt-extrusion from a KOKA-flow tester of 230° C. and a shear rate of 100 $sec^{-1}$.

On the other hand, a large stretching force must be applied in the case of simultaneously biaxially stretching the tubular composite laminate, and the tubular composite laminate itself should endure the stress during the stretching. In addition, the casing material made of the tubular composite laminate should endure the pressure at the time of filling the meat product thereinto and should not creep during the time of heat-treatment under the conditions of 70° to 95° C. for a few min to a few hours after filling and sealing. In order to fulfill the above-mentioned requirements, the thickness of the layer of the polyamide is 5 to 50 micrometers, preferably 20 to 40 micrometers.

In addition, since the layer of the polyamide is oil-resistant and accordingly, it is not swollen by the fats contained in the foodstuff to be packaged therewithin, and further, the layer in contact with the foodstuff has sufficient adhesion to cling to the foodstuff(hams and sausages), it is preferable to dispose the layer of the polyamide as the innermost layer in the casing material.

According to the present invention, in order to have a close adhesion of the copolymer of vinylidene chloride of the intermediate layer with the olefin resin of the outer layer or the polyamide of the inner layer, an adhesive layer is insertedly used therebetween. As the adhesive agent, a mixture of a copolymer of ethylene with vinyl acetate and a copolymer of ethylene with acrylic acid(refer to Japanese Patent Application Laying-Open No. 49-41476(1974)), a copolymer of ethylene with vinyl acetate and a copolymer of ethylene with ethyl acrylate (refer to Japanese Patent Application Laying-Open No. 51-119075 (1976)) have been publicly known, however, in the case wherein the respective layers are melt-coextruded as a 5-layer tubular composite laminate, or the respective layers except for the layer of the polyamide are melt-coextruded as a 4-layer tubular composite laminate and thereafter laminated still in molten state with the simultaneously melt-extruded tubular layer of the polyamide, thereby obtaining the 5-layer tubular composite laminate. And then the 5-layer tubular composite laminate is simultaneously and biaxially stretched into the 5-layer tubular composite laminate, an adhesive agent of excellent in adhesion for resisting the exfoliation between layers during the stretching operation is indispensable.

The above-mentioned publicly known adhesive agents were insufficient for preventing the exfoliation between layers during the stretching for preparing the heat-shrinkable composite laminate film of the present invention.

In the present invention, by the use of at least one specified adhesive agent selected from the group consisting of a modified copolymer obtained by modifying a copolymer of ethylene and a vinyl carboxylate or an acrylic ester with an ethylenically unsaturated carboxylic acid, a resinous material obtained by further modifying the above-mentioned modified copolymer with a metal compound, as the adhesive layer between the intermediate layer and each of the outer layers, the object of the present invention has been achieved for the first time and the present invention has been attained.

As the vinyl carboxylate to be copolymerized with ethylene, vinyl acetate or vinyl propionate is used, and as the acrylic ester, ($C_1$-$C_{18}$) alkyl acrylate is preferably used.

As the modifying agent for obtaining the modified copolymer of ethylene and vinyl carboxylate or acrylic ester, acrylic acid, methacrylic acid, maleic acid, fumaric acid or maleic acid anhydride is used. The term, modification, herein used means a reaction of introducing the ethylenically unsaturated carboxylic acid or an acid anhydride thereof into the copolymer of ethylene by grafting, etc. Another modifying agent for use in further modifying the modified copolymer of ethylene and a vinyl carboxylate or an acrylic ester is selected from the group consisting of alkali metal salts, alkali metal oxides, alkaline earth metal salts and alkaline earth metal oxides. In this case, modification means neutralization, etc. for introducing the metal into the modified copolymer. The amount of the ethylenically unsaturated carboxylic acid or the acid anhydride in the modified copolymer is preferably 0.01 to 10% by weight, and the amount of metal in the above-mentioned polymeric material as another adhesive agent is preferably in the range of 0.02 to 10 mol %.

As the representative one of the commercialized adhesive agent, the adhesive with a trade name of N-POLYMER ® (manufactured by Nippon Petrochemical Co., Ltd.) may be mentioned.

The thickness of the adhesive layer is not less than 1 micrometer and below 5 micrometers, preferably 1.5 to 4 micrometers. In the case where the thickness is below 1 micrometer, it is difficult to exhibit the suitable adhesion.

The process for preparing the heat-shrinkable composite laminate film according to the present invention is explained as follows.

Each of the four kinds of materials constructing the five layers of the heat-shrinkable composite laminate film of the present invention is melt-extruded from each of the four extruders and after being sent to a circular die, simultaneously co-extruded from the die while laminating the materials within the circular die in the form of a five-layer tubular composite laminate.

Otherwise, each of the four kinds of materials is extruded from a T-die of each of the four extruders while laminating the materials within T-die in the form of a flat 5-layer composite laminate film.

Each of the four kinds of materials constructing the five layers of the heat-shrinkable composite laminate film of the present invention is melt-extruded from each of the four extruders, after being sent to a circular die, extruded a four-layer composite laminate film comprising the outer layer of an olefin resin, the adhesive layer, the intermediate layer and the adhesive layer and a film of polyamide from the die, and then the four-layer composite laminate film and polyamide film as outer layer are laminate still in molten state, into a five-layer composite laminate film in which each of the two adhesive layers has been disposed between the intermediate layer and each of the outer layers.

Otherwise, each of the four kinds of materials is extruded from a T-die of each of the four extruders, after being sent to a T-die, extruded a four-layer composite laminate film comprising the outer layer of an olefin resin, the adhesive layer, the intermediate layer and the adhesive layer and a film of polyamide from the die, and then the four-layer composite laminate film and the polyamide film as outer layer are laminated still in molten state, into a five-layer composite laminate film in which each of the two adhesive layers has been disposed between the intermediate layer and each of the outer layers.

In general, it is extremely difficult to stretch the film of a polyamide or the composite laminate film comprising a layer of a polyamide because of the hydrogen bond of the polyamide, and such a film is generally extruded from a T-die in a flat form and is stretched biaxially by a tenter. However, in the case of preparing a film for use in packaging hams and sausages, it is preferable to extrude the material in a tubular form, and in such a case, the stretching of the tubular film has been generally carried out by the inflation technique. In the case where the tubular film of a polyamide is subjected to stretching by the inflation technique, the tension which is necessary to stretch the layer is so large that the thickness of the biaxially stretched film is apt to be uneven and the tubular film blows up resulting in the difficulty of preparing the film effectively in an industrial scale.

As a result of studying the process for preparing the heat-shrinkable composite laminate film comprising a layer of a polyamide in the industrial scale, the present inventors have found the following process.

Generally, in a process for processing a plastic material comprising linear high polymeric molecules to obtain a film thereof in which the linear high polymeric molecules have been oriented, the molten plastic material is once supercooled to fix the molecules in an amorphous state and thereafter, the thus supercooled plastic material is re-heated to an inflation temperature and the thus heated plastic material is stretched to effect the orientation of the linear high polymeric molecules of the film in the direction of stretching to a certain extent.

In the process for preparation of the heat-shrinkable composite laminate film according to the present invention, the materials of the film melt-extruded at a temperature of higher than the melting point of a high-melting polyamide are laminated still in molten state into a tubular composite laminate and the tubular composite laminate is rapidly cooled to the stretching temperature while simultaneously stretching the tubular composite laminate, thereby obtaining the heat-shrinkable composite laminate film excellent in transparency and provided with the stretching-orientation effect while preventing the formation of spherulites in the respective layers of the composite laminate film.

As the method of stretching the tubular film, a method of inflation by the air enclosed in the tubular film may be used, however, in the case of stretching the 5-layer tubular composite laminate including a layer of the polyamide according to the present invention, the necessary tension for carrying out the stretching is large, and accordingly, the pressure of the air used for inflation should be large enough. Such a large pressure causes focussing the stress on to the minor unevenness of the thickness of the extruded tubular film, thereby enlarging the extent of unevenness resulting in blow up of the tubular film. Under these conditions, it is difficult to carry out the continued stretching and the taking up of the stretched film.

However, according to the process of the present invention in which the melt-extruded materials from a circular die in a tubular form are laminated still in a molten state into a tubular composite laminate, and the thus formed tubular composite lamiate is then stretched along the circumferential outer surface of a conical inner mandrel set at the central position of the bottom of the circular die while simultaneously cooling the tubular composite laminate to the stretching temperature, it is possible to carry out the continuous stretching, thereby obtaining the heat-shrinkable composite laminate film taken up continuously.

The process for preparing the heat-shrinkable composite laminate film according to the present invention will be concretely explained while referring to the attached drawings as follows.

Figure 1:
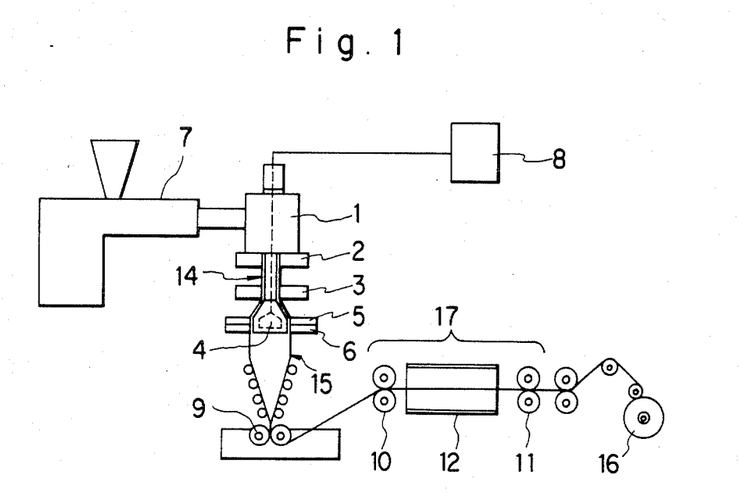
FIG. 1 is a schematic diagram of a preferred process for preparing the heat-shrinkable composite laminate film according to the present invention.

In FIG. 1, each of the four kinds of materials for the respective layers of the 5-layer tubular composite laminate is extruded by each of the four extruders represented by 7 in a molten state and transferred to the circular die 1.

In the circular die 1, the molten materials are formed into a 5-layer tubular composite laminate and extruded therefrom as a molten tubular composite laminate 14, which is then cooled by air from the air ring 2 provided just below the die-lip to a temperature at which the shape of the tubular composite laminate can be easily retained, preferably the temperature of higher than the crystallizing temperature of the polyamide of the inner layer by 5° to 10° C. for substantially retaining the polyamide in an amorphous state, and then the thus once cooled tubular composite laminate is further cooled to the stretching temperature such as a temperature between the crystallizing temperature and the secondary transition point of the polyamide, preferably at a cooling speed of higher than 50° C./sec by pouring a hot water at a temperature in the range of from the secondary transition point of the polyamide to a temperature of higher than the secondary transition point by 20° C., preferably by 5° to 10° C. on the outer surface of the tubular composite laminate as a thin membrane from a shower ring 3.

Thereafter, the thus cooled tubular composite laminate is pulled down by the take-up rolls 9 while sliding the tubular film along the outer circumferential surface of a conical inner mandrel 4 which is provided with at the center position of the bottom of the circular die via a vertical supporting rod 13, thereby carrying out the simultaneous biaxial stretching of the tubular composite laminate, the mandrel 4 being cooled to a temperature in a range of 30° to 80° C. by a heating medium controlled by a temperature controller 8.

In the above-mentioned operation, both the transversal stretch ratio in the direction of the diameter of the tubular composite laminate 14 and the longitudinal stretch ratio in the take-up direction of the tubular composite laminate 14 are decided by adjusting both the ratio of the diameter of the die-lip of the circular die to the maximum outside diameter of the inner conical mandrel and the ratio of the velocity of the tubular composite laminate in the direction of taking-up just before subjecting the tubular composite laminate to stretching to the taking-up velocity of the stretched tubular composite laminate by the rolls 9. In general, the stretch ratio of 1.5 to 5 is preferable both in the taking-up direction and in the transverse direction. Inconveniences such as the occurrence of cracks in the tubular composite laminate under stretching and the unbalance of the heat shrinkage rate between the longitudinal direction and the transverse direction of the thus obtained tubular composite laminate film, are caused in the case where the tubular composite laminate is stretched at stretch ratios not within the above-mentioned range.

Figure 2:
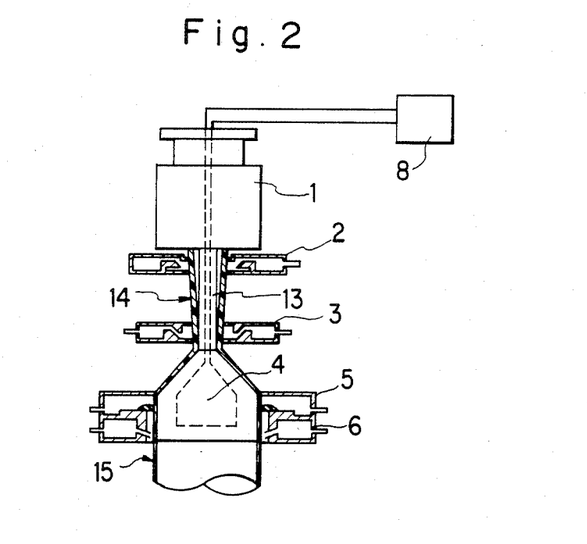
FIG. 2 is a cross-sectional view of the die and the conical mandrel of FIG. 1.

As are seen in FIGS. 1 and 2, a circular ring 5 for removing the hot water and a cooling ring 6 are provided around the periphery of the mandrel. The circular ring 5 serves the role of removing the hot water poured onto the tubular composite laminate at its stretching part and the cooling ring 6 supplies a cooling water at 5° to 30° C. onto the tubular composite laminate. Namely, both 5 and 6 serve a role of cooling the polyamide in the inner layer to a temperature of lower than the secondary transition point thereof and preventing the further stretching into the longitudinal direction. Since the tubular composite laminate is thus sufficiently cooled, even in the case where it is folded by a pair of pinching rolls 9, no adhesion occurs between the opposing inner layers of the folded tubular composite laminate film, and accordingly, it is not necessary of using any piling agent. The absence of the substance including the piling agent, which hinders the close adhesion of the innermost layer of a polyamide to hams and sausages is extremely favorable in the case of applying the heat-shrinkable tubular composite laminate film to packaging hams and sausages.

After being pinched and taken up by the rolls 9 the thus biaxially stretched tubular composite laminate film is then subjected to relaxation-treatment between the two pairs of rolls 10 and 11 (relaxation-zone 17). The rolls 11 are driven at the same or a little slower speed as compared to the speed of the rolls 10 and preferably, further subjected to relaxation-treatment by the air enclosed in the tubular composite laminate between rolls 10 and 11 for relaxing the excessively (may be) stretched tubular composite laminate and smoothing the wrinkles of the layers of the stretched tubular composite laminate.

Thereafter, the thus treated tubular composite laminate in a folded state is taken up by the rolls 16, if necessary, after being heated in a controlled atmosphere at 40° to 100° C. within an extreme-infrared ray oven 12. A heat-shrinkable composite laminated film excellent in transparency and luster as a folded tube is obtained.

Although the thus obtained heat-shrinkable composite laminate film according to the above process of the present invention has excellent properties as a casing material, particularly for packaging hams and sausages, occasionally it is required that the composite laminate film is not broken nor deformed under the severer operational conditions during the time of filling the article thereinto or during the time of thermal treatment after filling by the expansion of the article therein. Namely, it is required that the heat-shrinkable composite laminate film does not show creep phenomenon even at high temperature under the severer conditions than the conventional conditions. In order that the film does not show any creep even at high temperatures, it is necessary that the degree of orientation of the polymer chains constructing each layer of the composite laminate in the transversal direction (direction perpendicular to the take-up direction ) is higher than that in the take-up direction.

More in detail, in the case where a package (a casing material made of the heat-shrinkable composite laminate film containing a packed foodstuff therein) is considered to be a column, wherein the presure on the article is $P_o$, the thickness of the composite laminate film is t and the radius of the content is R. When the stress in the longitudinal direction (the take-up direction in the process for preparing the composite laminate film) of the composite laminate film is represented by $\delta_L$, $$\delta_L = \frac{R \times P_o}{2t} \text{ (L means longitudinal) and}$$

when the stress in the transversal direction (perpendicular to the longitudinal direction) of the composite laminate film is represented by $\delta_T$, $$\delta_T = \frac{R \times P_o}{t} \text{ (T means tranversal direction).}$$

Namely, the stress in the transversal direction on the composite laminate film ($\delta_T$) is 2 times as large as the stress in the longitudinal direction on the composite laminate film ($\delta_L$). In other words, the composite laminate film is subjected to a larger deformation force in the transversal direction than in the longitudinal direction.

Accordingly, the polymer chains constructing each layer of the composite laminate film have been preferably more highly oriented than in the transversal direction in the step of biaxial stretching in the process for preparing thereof.

The method for obtaining the higher orientation in the transversal direction than in the longitudinal direction will be explained as follows.

Figure 3:
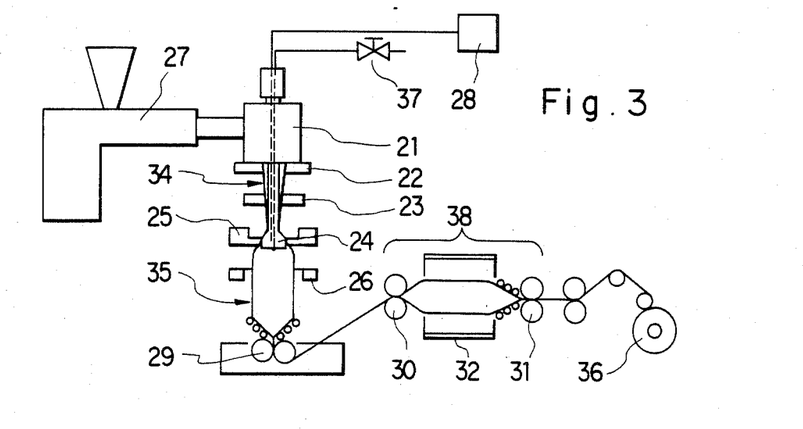
FIG. 3 is a schematic diagram of preferred process for preparing the heat-shrinkable composit laminate film according to the present invention and FIG. 4 is a cross-sectional view of the die and the conical mandrel of FIG. 3.

In FIG. 3, each of the four kinds of materials for the respective layers of the 5-layer tubular composite laminate is extruded by each of the four extruders represented by 27 in a molten state and transferred to the circular die 21, and in the circular die 21, the molten materials are formed into a 5-layer tubular composite laminate and extruded therefrom as a molten tubular composite laminate 34. After cooling the molten tubular composite laminate 34 to a temperature at which the tubular form is easily maintained, preferably to a temperature of 5° to 10° C. higher than the crystallizing temperature of the polyamide of the inner layer for maintaining the polyamide substantially in an amorphous state, the thus once cooled tubular composite laminate is further cooled to the stretch temperature such as between the crystallizing temperature and the secondary transition point of the polyamide, preferably at a cooling speed of higher than 50° C./sec by pouring a hot water at a temperature in the range of from the secondary transition point of the polyamide to a temperature of higher than the secondary transition point by 20° C., preferably by 5° to 10° C. onto the outer surface of the tubular composite laminate as a thin membrane from a shower ring 23.

Thereafter, the thus twice cooled tubular composite laminate is pulled down by the take-up rolls 29 while sliding the tubular composite laminate along the circumferential outer surface of a conical inner mandrel 24 which is provided with at a center position of the bottom of the circular die via a vertical supporting rod 33, thereby carrying out the simultaneous biaxial stretching of the tubular composite laminate, the mandrel 24 being cooled to a temperature in a range of 30° to 80° C. by a heating medium controlled by a temperature controller 28.

Figure 4:
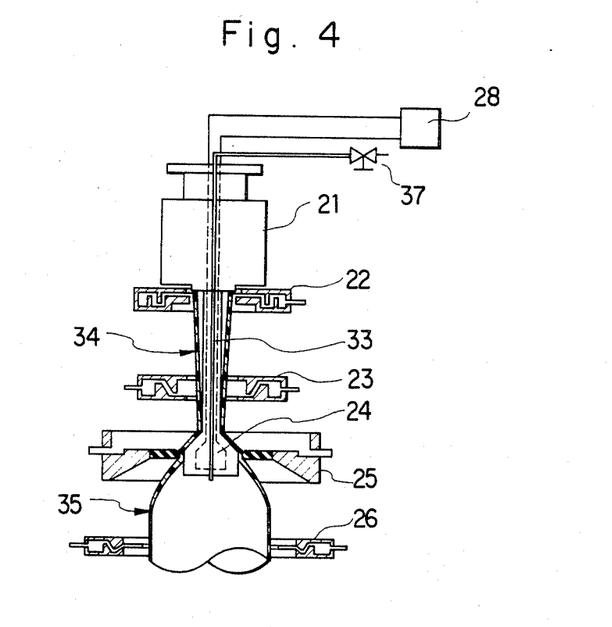

The tubular composite laminate is then subjected to the secondary simultaneous biaxial stretching by inflating the tubular composite laminate with the enclosed air within the tubular composite laminate at a suitable pressure controlled by the air-pressure controller 37 to the extent that the diameter of the thus inflated tubular composite laminate is larger than that of the conical mandrel 24 and by pulling the tubular composite laminate with the take-up rolls 29. The hot water poured from the shower ring 23 is removed by the pushing ring 25 shown in FIG. 4.

In the above-mentioned case, the ratio of the inner diameter of the die-lip of the circular die to the maximum outer diameter of the conical inner mandrel 24 is preferably in a range of 1.5 to 2.5, and furthermore, the stretch ratio of the tubular composite laminate in the longitudinal direction (direction of taking-up) and that in the transversal direction (perpendicular to the longitudinal direction) are decided by adjusting both the ratio of the internal diameter of the die-lip to the maximum diameter of the inflated tubular composite laminate and the ratio of the velocity of the tubular composite laminate 34 just before subjecting to the first stretching to the velocity of taking-up at the rolls 29. In general, both the stretch ratios are preferably in the range of 2 to 5.

The stretched tubular composite laminate 35 by the conical inner mandrel in the primary stretching and the air pressure in the secondary stretching is not necessary to be further stretched, and accordingly, the further stretching in the direction of taking-up of the tubular composite laminate film 35 is prevented by cooling thereof by the cooling water at 5° to 30° C. sprayed onto the tubular composite laminate film from the cooling ring 26 to bring the temperature of the tubular composite laminate film to that lower than the secondary transition point of the polyamide. Since the tubular composite laminate film 35 is thus sufficiently cooled, the inner layers of the thus cooled pinched tubular composite laminate film do not adhere to each other if it is folded, thereby not necessitating the use of any pilling agent therebetween.

The thus thermally stabilized tubular composite laminate film 35 is pinched and folded by take-up rolls 29 and the thus folded tubular composite laminate film is then subjected to relaxation-treatment between the two pairs of rolls 30 and 31 (relaxation-zone 38) for relaxing the excessive stretching effect, if any, and smoothing the tubular composite laminate film, the pair of rolls 31 being driven by the same or a little smaller speed as compared to the pair of rolls 30, and the relaxation-treatment being carried out by the enclosed air in the tubular composite laminate film instead of bringing through the two pair of rolls 30 and 31. If it is necessary, the relaxed tubular composite laminate film is heated in a controlled atmosphere at 40° to 100° C. in a extreme-infrared ray oven 32. Thereafter, the folded heat-shrinkable composite laminate film is take up by the rolls 36 to be a heat-shrinkable composite laminate film excellent in transparency and luster.

The heat shrinkage of the thus obtained heat-shrinkable composite laminate film according to the present invention is on the average larger than 15% after relaxing thereof for 3 sec at 90° C. both in the longitudinal direction, that is, the take-up direction and in the transversal direction perpendicular to the longitudinal direction.

In the case where the thus prepared heat-shrinkable biaxially stretched 5-layer composite laminate film is filled with a foodstuff and the thus casing film is heated together with the thus filled article, a suitable heat-shrinkage occurs in the composite laminate film and the film closely adheres to the content, for instance, a processed meat product, without exhibiting the creasy or pleated appearance.

The present invention will be explained more in detail while referring to the following nonlimitative examples and comparative examples as follows:

The present invention will be more precisely explained while referring to Examples as follows.

However, the present invention is not restricted to Examples under mentioned. From the foregoing description, one skilled in the art can easily ascertain the essential characteristics of this invention, and without departing from the spirit and scope thereof, can make various changes and modifications of the invention to adapt it to various usages and conditions.

EXAMPLE 1

Each of the following polymeric materials was melt-extruded by each of the four extruders (7):

A: a mixture consisting of
100 parts by weight of a copolymer of vinylidene chloride (83% by weight) and vinyl chloride (17% by weight),
1 part by weight of dibutyl sebacate and
2 parts by weight of an epoxydized soy-bean oil.

B: an adhesive material obtained by modifying the grafted copolymer by magnesium carbonate ($MgCO_3$), the grafted copolymer being obtained by grafting a copolymer of ethylene and ethyl acrylate containing 15% by weight of ethyl acrylate units with maleic anhydride. The melt index of the material was 6 g/10 min and the content of maleic anhydride in the grafted copolymer was 0.5% by weight. The content of Mg in the material was 0.84 mol %.

C: a low-density polyethylene of a melt index of 1.22 g/10 min and a density of 0.92

D: a polyamide, nylon 6–66, manufactured by Toray Co., Ltd. of a trade name of CM-6041 of a melting point of 200° C., crystallization temperature of 150° C., a secondary transition point of 60° C. and $\eta^*$ (melt index) of $1.7 \times 10^4$ poise at 220° C.

The thus melt-extruded four kinds of polymeric materials were introduced into a co-extruding circular die 1 and laminated still in molten state into a 5-layer tubular composite laminate in the order of D/B/A/B/C from the inner to the outer within the die, and the thus formed 5-layer tubular composite laminate 14 from the outlet of the die, the temperature of the circular die being 220° C. at the outlet of the die. The thus extruded tubular composite laminate 14 was cooled by the air at 0.2 kg/cm$^2$G supplied from the air ring 2 provided with the die-lip position, the external surface temperature of the tubular just before reaching the position of the shower ring 3 from which hot water is supplied being 170° C. measured by a non-touching type infrared thermometer.

The thus melt-extruded 5-layer tubular composite laminate 14 was treated by hot water at 65° C. supplied from the shower ring 3 and pulled down by the taken-up rolls 9 while sliding the tubular composite laminate 14 along the external circumferential surface of a conical inner mandrel 4 cooled at 50° C. of a maximum diameter at the lower cylindrical part of 3 times as large as the inner diameter of the die-lip, thereby stretching simultaneously into the take-up direction (longitudinal direction) and into the transversal direction (perpendicular to the longitudinal direction).

The speed of the take-up rolls 9 was 10 m/min, and the speed of the tubular composite laminate just before stretching was 3 m/min. The stretch ratio in the direction of taking-up was about 3.3. Thereafter, the hot water was removed by the circular ring 5 and a cooling water at 15° C. was sprayed onto the tubular composite laminate film 15 from the cooling ring 6.

Thereafter, the thus cooled tubular laminate film 15 was subjected to the treatment of smoothing the wrinkles in the relaxation-zone 17 and then taken up by the rolls as the folded heat-shrinkable composite laminate film of 230 mm in folded width and of the layer construction of 30 micrometers of D layer, 3 micrometers in B layer, 10 micrometers in A layer and 10 micrometers in C layer with the total thickness of 56 micrometers.

The physical properties of the thus obtained heat-shrinkable 5-layer composite laminate film and a clipped package prepared by filling a foodstuff into the casing material of the laminate film, determined by the methods shown in Table 1, are shown in Table 2.

TABLE 1

| Item of determination | Method of determination |
|---|---|
| Thermal shrinkage in hot water | Linear shrinkage to the original length of a specimen (10 cm × 10 cm) in the longitudinal direction and that in the transversal direction, average of the values on 20 specimens after immersing in hot water at 90° C. for 3 sec. |
| Adhesion between layers | Adhesion between the polyamide layer and the intermediate layer was determined by the T(180°)-peeling method on a tape-likely cut piece of 20 mm in width while using a TENSILON ® (a tensile tester, made by TOYO SEIKI Co., Ltd.). The breaking stress represents the adhesion. |
| Gas-barrier property against gaseous oxygen | Volume of gaseous oxygen passed through the specimen at 30° C. and RH of 100%. |
| Gas-barrier property against water vapour | Volume of water vapour passed through the specimen at 40° C. and RH of 95%. |
| Cold-resistance (number of pin-holes formed) | After folding a casing material of the specimen 10 m in length into 1 m in length by compression while making creases therein in an atmosphere of 5° C., one of the ends of the casing was closely sealed and air was blown into the folded casing material at 0.3 kg/cm$^2$G to restore the original length. The thus treated specimen was brought into water at ordinary temperature to enumerate the number of pin holes formed by the treatment. |
| Degree of adhesion of the film to meat (extent of clinging) | 0: remarkable exfoliation with bouillon remaining between the specimen and meat.<br>1: without adhesion of meat to the specimen with bouillon on the surface thereof.<br>2: without adhesion of meat to the specimen without bouillon on the surface thereof.<br>3: with adhesion of meat onto 10% of the surface of the specimen in area.<br>4: with adhesion of meat onto 25% of the surface of the specimen in area.<br>5: with adhesion of meat onto 50% of the surface of the specimen in area. |

TABLE 1-continued

| Item of determination | Method of determination |
|---|---|
| | 6: with adhesion of meat onto 75% of the surface of the specimen in area.<br>7: with adhesion of meat onto almost all surface of the specimen.<br>8: with adhesion of meat onto all surface of the specimen and in the case of forced exfoliation, a large amount of meat adhered to the surface of the specimen. |
| Appearance of the package | After filling about 6 kg of sausage meat into a casing material of 230 mm in folded width prepared from a specimen, the thus package was heat-treated at 80° C. for 2 hours in a state of hanging down, and then kept in a refrigerator at 5° C. for one day. Thereafter, the degree of crease-formation and the change of the external diameter of the package were observed and evaluated by the following criteria:<br>G: without any crease and change of diameter<br>F: creases formed partly with a change in diameter.<br>B: remarkable formation of creases and remarkable change in diameter |

EXAMPLES 2 to 5

In Examples 2 to 4, each of the three 5-layer heat-shrinkable composite laminates was prepared in the same procedures as in Example 1 except for using each of the following olefin resins for the fifth (outer) layer instead of the low-density polyolefin C in Example 1, and the physical properties of the thus prepared 5-layer heat-shrinkable composite laminate films were determined by the methods shown in Table 1, the results being shown in Table 2:

Olefin Resins

In Example 2:
E: A low-density linear polyethylene (Ultzex ®-2021 L, made by MITSUI Chem. Co., Ltd.)
In Example 3:
F: a copolymer of ethylene and propylene (FS-4311, made by SUMITOMO Chem. Co., Ltd.)
In Example 4:
G: an ionomer resin (HI-MILAN ®-1601, made by MITSUI Polychem. Co., Ltd.)

In Example 5, a 5-layer heat-shrinkable composite laminate film was prepared in the same procedures as in Example 1 except for using the following polyamide for the first (inner) layer instead of nylon 6-66 in Example 1 and using a water at 45° C. for cooling instead of the water at 65° C. in Example 1, and the physical properties thereof were determined by the methods shown in Table 1, the results being shown also in Table 2:
In Example 5:
H: a polyamide, nylon 12 (DAICEL Chem. Co., Ltd.) of a melting point of 147° C., a secondary transition point of 40° C. and a crystallization temperature of 104° C.

EXAMPLE 6

A 5-layer heat-shrinkable composite laminate film was prepared in the same procedures as in Example 1 except for using the following polymer I as the adhesive agent instead of the adhesive agent in Example 1, the physical properties of the thus prepared heat-shrinkable composite laminate film were determined by the method shown in Table 1, the results being shown also in Table 2:

In Example 6:

I: a grafted copolymer of ethylene and ethyl acrylate containing 18% by weight of ethyl acrylate units with a grafting agent (maleic anhydride), melt index of Polymer I being 6 g/10 min and the content of maleic anhydride in Polymer I being 0.5% by weight.

EXAMPLE 7

Each of the following polymeric materials was melt-extruded by each of the four extruders (27):

A: a mixture consisting of
  100 parts by weight of a copolymer of vinylidene chloride (83% by weight) and vinyl chloride (17% by weight),
  1 part by weight of dibutyl sebacate and
  2 parts by weight of an epoxydized soy-bean oil.

B: an adhesive material obtained by modifying the grafted copolymer by magnesium carbonate ($MgCO_3$), the grafted copolymer being obtained by grafting a copolymer of ethylene and ethyl acrylate containing 15% by weight of ethyl acrylate units with maleic anhydride. The melt index of the material was 6 g/10 min and the content of maleic anhydride in the grafted copolymer was 0.5% by weight. The content of Mg in the material was 0.84 mol %.

C: a low-density polyethylene of a melt index of 1.22 g/10 min and a density of 0.92

D: a polyamide, nylon 6-66, manufactured by Toray Co., Ltd. of a trade name of CM-6041 of a melting point of 200° C., crystallization temperature of 150° C., a secondary transition point of 60° C. and $\eta^*$ (melt index) of $1.7 \times 10_4$ poise at 220° C.

The thus melt-extruded four kinds of polymeric materials were introduced into a co-extruding circular die 21 and laminated still in molten state into a 5-layer tubular composite laminate in the order of D/B/A/B/C from the inner to the outer within the die, and the thus formed tubular composite laminate 34 from the outlet of the die, the temperature of the circular die being 220° C. at the outlet of the die. The thus extruded tubular composite laminate 34 was cooled by the air at 0.2 kg/cm²G supplied from the air ring 2 provided with the die-lip position, the external surface temperature of the tubular just before reaching the position of the shower ring 3 from which hot water is supplied being 170° C. measured by a non-touching type infrared thermometer.

Then, the thus melt-extruded 5-layer tubular composite laminate 34 was treated by hot water at 60° C. supplied from the shower ring 23 and pulled down by the taken-up rolls 29 while sliding the tubular 24 along the external circumferential surface of the conical inner mandrel 24 cooled at 60° C. with a maximum diameter of the lower cylindrical part thereof of 2 times as large as the diameter of the die-lip, thereby the simultaneously biaxially stretching was carried out. Just after the primary stretching, the thus stretched tubular composite laminate was subjected to the further simultaneous biaxial stretching by the enclosed air in the tubular composite laminate, at 0.3 kg/cm²G controlled by an air pressure controller 37 to a diameter of three times as large as the inner diameter of the die-lip and longitudinally while pulling down the tubular composite laminate 35 by the take-up rolls 29 of a speed of 20 m/min.

Since the transferring speed of the tubular composite laminate just before stretching was 6 m/min, the stretch ratio of the tubular composite laminate film in the direction of taking-up was about 3.3. The hot water supplied from the shower ring 23 was removed by the circular ring 25 which also served to prevent the leakage of compressed air from the tubular composite laminate by pushing the inflated tubular composite laminate film closely to the outer circumferential surface of the conical inner mandrel. The thus treated tubular composite laminate film is cooled by spraying cooled water at 15° C. from the shower ring 26 and then subjected to smoothing of creases in the relaxation-zone 38 to be taken-up as a biaxially stretched, folded heat-shrinkable composite laminate film of 230 mm in folded width and of the layer-construction of 30 micrometers in D layer, 3 micrometers in B layer, 10 micrometers in A layer and 10 micrometers in C layer, the total thickness of the film being 56 micrometers.

The physical properties of the thus prepared heat-shrinkable composite laminate film according to the present invention and of the package prepared by filling a foodstuff into the casing material made of the film and clipping the end thereof were determined by the methods shown in Table 1, the results being shown in Table 2.

It was noticed that the thermal shrinkage rate of the thus prepared film is larger in the transversal direction than in the longitudinal direction. As is seen in Table 2, any formation of creases and any change of the external diameter of the package prepared by using the thus prepared heat-shrinkable composite laminate film were not found in the appearance test of a long period (4 hours) of heat-treatment at 90° C. in a hanging state holding about 6 kg of sausage meat therein.

TABLE 2

| Specimen prepared by | Construction of layers (thickness¹) | | | | | Temperature of warm water (°C.) | Stretchability | Interlayer adhesion (g/20 mm) | Heat-shrinkage (%) L/T² | Gas barrier property | | Cold resistance number of pinholes | Adhesion to meat | Appearance of packed casing | Remarks |
|---|---|---|---|---|---|---|---|---|---|---|---|---|---|---|---|
| | 1st | 2nd | 3rd | 4th | 5th | | | | | against $O_2$ (cc/m² · day · atm) | against water vapour (g/m² · day) | | | | |
| Example 1 | D (30) | B (3) | A (10) | B (3) | C (10) | 65 | good | 800 | 25/20 | 50 | 5 | 0 | 7 | G | |
| Example 2 | D (30) | B (3) | A (10) | B (3) | E (10) | 65 | good | 800 | 22/18 | 50 | 5 | 0 | 7 | G | |
| Example 3 | D (30) | B (3) | A (10) | B (3) | F (10) | 60 | good | 800 | 22/17 | 50 | 5 | 0 | 7 | G | |
| Example 4 | D (30) | B (3) | A (10) | B (3) | G (10) | 63 | good | 800 | 25/20 | 50 | 5 | 0 | 7 | G | |
| Example 5 | H (30) | B (3) | A (10) | B (3) | C (10) | 45 | good | 600 | 27/25 | 50 | 5 | 0 | 7 | G | |

TABLE 2-continued

| Specimen prepared by | Construction of layers (thickness[1]) | | | | | Temperature of warm water (°C.) | Stretchability | Interlayer adhesion (g/20 mm) | Heat-shrinkage (%) L/T[2] | Gas barrier property | | Cold resistance number of pinholes | Adhesion to meat | Appearance of packed casing | Remarks |
|---|---|---|---|---|---|---|---|---|---|---|---|---|---|---|---|
| | 1st | 2nd | 3rd | 4th | 5th | | | | | against O$_2$ (cc/m$^2$ · day · atm) | against water vapour (g/m$^2$ · day) | | | | |
| Example 6 | D (30) | I (3) | A (10) | I (3) | C (10) | 65 | good | 500 | 25/20 | 50 | 5 | 0 | 7 | G | |
| Example 7 | D (30) | B (3) | A (10) | B (3) | C (10) | 60 | good | 800 | 22/27 | 50 | 5 | 0 | 7 | G | |
| Comparative Example 1 | D (30) | J (3) | A (10) | J (3) | C (10) | 65 | good | 150 | 25/20 | 50 | 5 | — | 7 | F | partial exfoliation between layers |
| Comparative Example 2 | Single layer A resin (40) | | | | | — | — | — | 20/15 | 80 | 3 | 4 | 4 | F | remarkable creases on shoulder part of casing |
| Comparative Example 3 | Single layer D resin (55) | | | | | — | — | — | 15/15 | 150 | 50 | 0 | 7 | F | difficult to preserve long |
| Comparative Example 4 | Single layer polyester (20) | | | | | — | — | — | 10/0 | 110 | 26 | 0 | 2 | B | remarkable exfoliation with bouillon, not to preserve long |

Notes:
[1]micrometer
[2]L/T: longitudinal/transversal

EXAMPLE 8

A biaxially stretched, 5-layer composite laminate film was prepared by the same procedures as in Example 7 except for using a polymeric material E, a low-density linear polyethylene (Ultzex®-2021 L, made by MITSUI CVhem. Co. Ltd.) instead of the polymeric material C, a low-density polyethylene, in Example 7. The respective thicknesses of the layers laminated in the order of D/B/A/B/E from the innermost layer were 30 micrometers in D, 3 micrometers in B, 10 micrometers in A and 10 micrometers in E, the total thickness being 56 micrometers.

After filling about 6 kg of sausage meat in the thus prepared heat-shrinkable 5-layer composite laminate film by a conventional method and sealing the ends, the thus package was heat-treated at 90° C. for 4 hours at a hanging state, and then the package was kept in a refrigerator at 5° C. for 24 hours.

No crease nor any change in diameter was observed on the thus treated package.

Further, physical properties of the heat-shrinkable composite laminate films prepared respectively in Examples 1, 2, 7 and 8 were determined by the respective methods shown in Table 3 and the results are shown in Table 4.

TABLE 3

| Physical property | Methods for Determination |
|---|---|
| | Method |
| Tensile strength | according to Japanese Industrial Standards Z-1702 |
| Elongation at break | according to Japanese Industrial Standards Z-1702 |
| Stress in thermal shrinkage | Shrinking force shown by a tape-likely cut piece of a specimen, 20 mm in width held by a pair of chaks separated to each other by 100 mm on a tensile tester under an initial load of 10 g while raising the ambient temperature at a raising rate of 2° C. per min, expressed by stress at 80° C. |
| Creep in hot water | A tape-likely cut piece of a specimen is immersed into hot water at 80° C. while hanging a sinker corresponding to 1 kg/mm$^2$ from the piece, for 10 sec. After cooling just after immersing, the sinker is removed, and the rate of elongation to the original length is determined to be expressed by %. |

TABLE 4

| Specimen prepared in | Tensile strength (kg/mm$^2$) | Elongation at break (%) | Stress in heat-shrinkage (kg/mm$^2$) | Creep in hot water (%) |
|---|---|---|---|---|
| Example 1 | 9(L)[(1)] 5(T)[(2)] | 96(L) 166(T) | 240(L) 180(T) | 10(L) 52(T) |
| Example 2 | 10(L) 8(T) | 90(L) 180(T) | 200(L) 150(T) | 8(L) 40(T) |
| Example 7 | 11(L) 12(T) | 155(L) 100(T) | 220(L) 240(T) | 23(L) 12(T) |
| Example 8 | 10(L) 13(T) | 125(L) 84(T) | 200(L) 210(T) | 16(L) 12(T) |

Notes:
(L) means the value in the longitudinal direction, i.e., the direction of taking-up in the process.
(T) means the value in the direction perpendicular to the longitudinal direction.

COMPARATIVE EXAMPLE 1

A biaxially stretched, 5-layer composite laminate film was prepared by the same procedures as in Example 1 except for using the following material J for the adhesive layer instead of the adhesive agent in Example 1, the physical properties of the thus prepared film being shown in Table 2:

J: a copolymer of ethylene and ethyl acrylate containing 18% by weight of ethyl acrylate unit, of a melt index of 6 g/10 min.

In the case where the thus prepared film was used for meat packaging, it was experienced that exfoliation between layers was apt to occur during the operation of filling the meat. In this point, the heat-shrinkable composite laminate film prepared by using the adhesive agent according to the present invention was clearly superior to the film prepared in Comparative Example 1.

COMPARATIVE EXAMPLES 2 to 4

As the Comparative Examples, physical properties of three kinds of the commerciallized single layer casing films are shown in Table 2. As are seen in Table 2, the superiority of the film according to the present invention to those commerciallized films is clearly recognizable.

What is claimed is:

1. A heat-shrinkable composite laminate film comprising an intermediate layer having a thickness of from 3 to 30 $\mu$m and comprising a copolymer of from 65 to 95% by weight of vinylidene chloride and from 5 to 35% by weight of a comonomer copolymerizable with vinylidene chloride, an outer layer of an olefin resin having a thickness of from 5 to 50 $\mu$m, another outer layer of a polyamide having a thickness of from 5 to 50 $\mu$m and two adhesive layers respectively disposed between the intermediate layer and each of the two outer layers, each of the adhesive layers having a thickness of not less than 1 $\mu$m and below 5 $\mu$m and being at least one resinous material selected from the group consisting of a modified copolymer obtained by modifying a copolymer of ethylene and a vinyl carboxylate or an acrylic ester with an ethylenically unsaturated carboxylic acid or an acid anhydride thereof and a polymeric material obtained by further modifying said modified copolymer with a metal compound.

2. A heat-shrinkable composite laminate film according to claim 1, wherein the heat-shrinkage thereof in the direction parallel to the take-up direction of preparing the film, and the heat-shrinkage thereof in the direction perpendicular to the take-up direction are larger than 15% at 90° C., respectively.

3. A heat-shrinkable composite laminate film according to claim 1, wherein said olefin resin is one member selected from the group consisting of high-density polyethylene, middle-density polyethylene, low-density polyethylene, a copolymer of ethylene and vinyl acetate, a copolymer of ethylene and an acrylic ester, polypropylene, a copolymer of ethylene and propylene, a copolymer of ethylene and an alpha-olefin other than propylene and an ionomer.

4. A heat-shrinkable composite laminate film according to claim 1, wherein said polyamide is one member selected from the group consisting of nylon 6, nylon 6-66, nylon 6-10 and nylon 12.

5. A heat-shrinkable composite laminate film according to claim 1, wherein said polymeric material has been prepared by further modifying said modified copolymer with the metal compound selected from the group consisting of alkali metal salts, alkali metal oxides, alkaline earth metal salts and alkaline earth metal oxides.

6. A heat-shrinkable composite laminate film according to claim 1, wherein said modified copolymer is prepared by modifying a copolymer of ethylene and a vinyl carboxylate or an acrylic ester with an ethylenically unsaturated carboxylic acid selected from the group consisting of acrylic acid, methacrylic acid, maleic acid and fumaric acid, and an acid anhydride thereof.

7. A heat-shrinkable composite laminate film according to claim 6, wherein the content of the ethylenically unsaturated carboxylic acid in the modified copolymer is 0.01 to 10% by weight.

8. A heat-shrinkable composite laminate film according to claim 6, wherein the content of metal in said polymeric material is 0.02 to 10 mol %.

* * * * *